United States Patent [19]

Potter

[11] Patent Number: 4,733,772

[45] Date of Patent: Mar. 29, 1988

[54] POWER AND FREE ROLLER CONVEYOR

[75] Inventor: Michael S. Potter, Birmingham, England

[73] Assignee: Sponmech Limited, Stourbridge, England

[21] Appl. No.: 812,965

[22] Filed: Dec. 24, 1985

[30] Foreign Application Priority Data

Jan. 10, 1985 [GB] United Kingdom ............... 8500592

[51] Int. Cl.⁴ .............................................. B65G 13/02
[52] U.S. Cl. ..................................... 198/781; 198/789
[58] Field of Search ............... 198/781, 780, 787, 789, 198/791, 842, 843; 74/202, 206

[56] References Cited

U.S. PATENT DOCUMENTS

| 3,667,589 | 6/1972 | Constable | 198/781 |
| 3,753,485 | 8/1973 | Fromme et al. | 198/781 |
| 4,524,861 | 6/1985 | Matsushita | 198/781 |

FOREIGN PATENT DOCUMENTS

| 300359 | 7/1916 | Fed. Rep. of Germany . |
| 7716809 | 5/1977 | Fed. Rep. of Germany . |
| 3148176 | 6/1983 | Fed. Rep. of Germany . |
| 8322888.8 | 11/1983 | Fed. Rep. of Germany . |
| 8135442.6 | 11/1983 | Fed. Rep. of Germany . |
| 3412066 | 10/1985 | Fed. Rep. of Germany . |
| 8220440 | 10/1983 | France . |
| 452381 | 8/1936 | United Kingdom . |
| 1168213 | 10/1969 | United Kingdom . |
| 1293720 | 10/1972 | United Kingdom . |
| 1304198 | 1/1973 | United Kingdom . |
| 1365890 | 9/1974 | United Kingdom . |
| 1401593 | 7/1975 | United Kingdom . |
| 1482505 | 8/1977 | United Kingdom . |
| 2004242 | 3/1979 | United Kingdom . |
| 2004243 | 3/1979 | United Kingdom . |
| 1561373 | 2/1980 | United Kingdom . |

Primary Examiner—James B. Marbert
Attorney, Agent, or Firm—Trexler, Bushnell, Giangiorgi & Blackstone, Ltd.

[57] ABSTRACT

A plurality of rollers are carried by a support and have friction wheels fixedly secured, the wheels being frictionally engaged by further friction wheels which are slidably and non-rotatably carried on an input drive shaft. Biasing springs on the shaft urge the wheels into engagement with the wheels and the bias of the springs is adjustable by collars on the shaft to selectively vary the torque transmitted from the shaft to the rollers.

3 Claims, 1 Drawing Figure

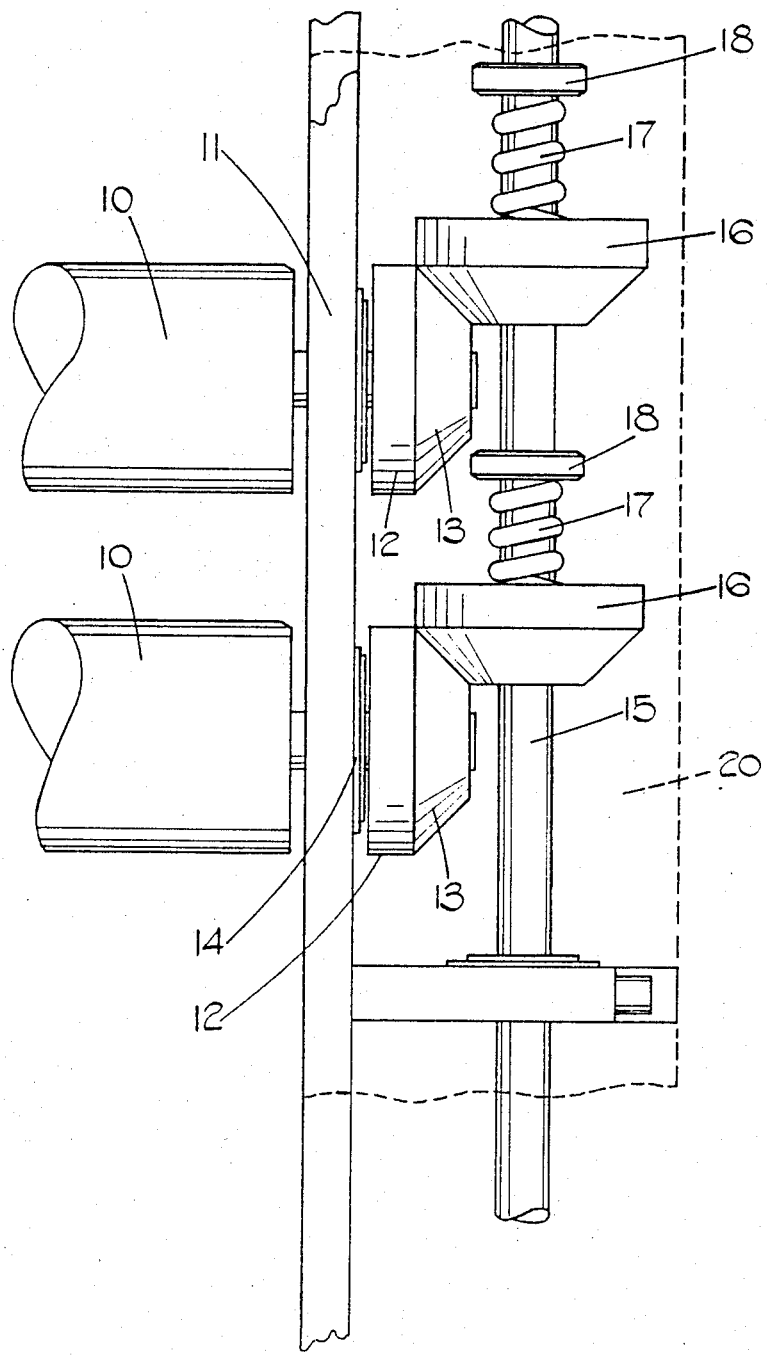

POWER AND FREE ROLLER CONVEYOR

This invention relates to power and free roller conveyors, that is to conveyors whose rollers frictionally engage an input drive so that the rollers do not rotate when articles carried thereby are prevented from moving along the conveyor.

It is known to provide power and free roller conveyors in which at least some of the rollers have frictional driving engagement with driven shafts which extend axially through the rollers. The arrangement is such that the weight of an article on a roller results in sufficient frictional force to drive the roller, but if the article is arrested the frictional driving engagement is overcome and the roller ceases to rotate, thereby avoiding wear on the transported articles. For satisfactory operation of such conveyors the friction force between each roller and its drive shaft is critical, being dependent on the weight of the articles being transporrted. This friction force can be radically altered by the presence of dirt between the rollers and the shafts extending through them, and it has been found necessary to provide sealing devices between the ends of each roller and its shaft. Additionally, with the arrangement described above, it is not possible to alter the frictional engagement so as precisely to suit the weight of the transported articles.

It is also known from GB-2004243B to provide a plurality of load-carrying wheels which are in frictional engagement with an input shaft, the input shaft being movable by an actuator into simultaneous engagement with the aforesaid wheels. This arrangement has the disadvantage that driving torque to each load-carrying wheel is the same, whereas it is desirable that driving torque should be reduced to selected rollers which are adjacent a stop or abutment for arresting articles carried by the conveyor. Alternatively it may be required to increase driving torque to wheels or rollers which are required to move articles on an incline.

Additionally the making of a friction drive direct to the load-carrying rollers has the effect that the friction drive zones cannot be enclosed, and are therefore liable to contamination which affects the friction characteristics.

It is an object of the present invention to provide a power and free roller conveyor in which the foregoing disadvantages are overcome.

According to the invention there is provided a power and free roller conveyor including a support element, a plurality of rollers mounted on said support element, an input drive shaft and a plurality of arrangements for providing a friction drive between said shaft and respective ones of said rollers, said arrangements for providing the friction drive comprising a plurality of transmission devices coupled to the respective rollers for non-slipping rotation therewith, a plurality of drive elements mounted on said shaft for rotation thereby, and a plurality of biasing means mounted on said shaft for urging said drive elements into frictional driving engagement with respective ones of said transmission devices.

An embodiment of the invention will now be described by way of example only and with reference to the accompanying drawing which is a plan view of part of a roller conveyor.

A plurality of rollers 10 are mounted for free rotation between side rails 11, only one of which is shown. Each roller 10 has fixedly secured thereto a transmission device in the form of a friction wheel 12 having a frusto-conical surface 13 with a 90° included angle. The rollers 10 and wheels 12 are mounted in suitable bearings 14 for free rotation in the side rails 11. An input drive shaft 15 extends parallel to the rail 11 adjacent the wheels 12. A plurality of drive elements in the form of further friction wheels 16 are splined or keyed to the shaft 15 for rotation therewith and limited axial movement relative thereto. The wheels 16 also have frusto-conical surfaces with 90° included angles which are biased into engagement with the surfaces 13 by springs 17. The bias of the springs 17 may be varied by means of axially adjustable collars 18 on the shaft 15 so that the torque applied by the shaft 15 to each of the rollers 10 may be altered as required.

Preferably the wheels 12 are of steel and the wheels 16 of a suitable plastics material, so that if the rollers 10 are arrested while the shaft 15 continues to rotate, substantially no wear will take place on the wheels 12, but the frusto-conical surfaces of the wheels 16 will tend to wear evenly over their whole area. Preferably also the wheels 12, 16 and shaft 15 are surrounded by a suitable, readily removable housing, indicated at 20, supported on the rail 11. Foreign matter is thus kept from the wheels 12, 16 which may, in any case, readily be cleaned without dismantling the conveyor, or moving articles which may be resting on the rollers.

The arrangement described provides an effective power and free conveyor without the elaborate measures hitherto considered necessary to prevent rollers from continuing to rotate even when articles supported thereon have been arrested. Additionally the preferred use of frusto-conical friction wheels avoids the requirement for helical gears which are commonly used to transmit drive in known power and free conveyors. Axial movement of the wheels 16 also enables smaller diameter wheels 12 to be fitted in locations where it is desired to speed up movement of transported articles, for example immediately following a stop or abutment so that articles released from the stop may be spaced apart without the need for escapement mechanisms in the stop. In known power and free roller conveyors the drives to selected rollers in one assembly cannot readily be adjusted so as to transport articles satisfactorily up a significant incline or to reduce driving torque to selected rollers adjacent a stop for the transported articles. In the present invention the bias provided by the spring 17 may readily be adjusted at required locations in a conveyor system to effect up-hill movement.

I claim:

1. A power and free roller conveyor including a support, a plurality of rollers rotatably mounted on said support, an input drive shaft extending substantially perpendicularly of said rollers, and a plurality of friction drive arrangements between said shaft and respective ones of said rollers, each of said friction drive arrangements being independently adjustable and comprising a pair of frictionally interengaged drive and driven wheels mounted one on said roller and one on said drive shaft respectively for non-slipping rotation therewith, means for mounting one of said pair of interengaged wheels to its associated one of said rollers and said drive shaft such that the said wheel is non-rotatable relative to, while at the same time is permitted limited axial travel relative to the associated one of said rollers and said drive shaft on which it is mounted, biasing means urging said one wheel into frictional engagement with the other one of said pair of interengaged wheels, and adjustment means for varying the axial force applied by said biasing means to said one wheel to regulate the driving torque applied thereby to said other wheel such that said first and second frictionally engaged wheels constitute a single clutch-like structure through which substantially the entire torque is delivered from said shaft to each of said rollers through one of the friction drive arrangements and such that the amount of torque transmitted through each of said friction drive arrangements to the associated roller may be independently adjusted.

2. A power and free roller conveyor as claimed in claim 1 in which said drive wheels and said driven wheels have mutually engaged fursto-conical surfaces.

3. A power and free roller conveyor according to claim 1 in which said one wheel is mounted on said input drive shaft.

* * * * *